Aug. 3, 1926.
E. P. O'REILLY
1,594,428
PISTON
Filed August 18, 1922
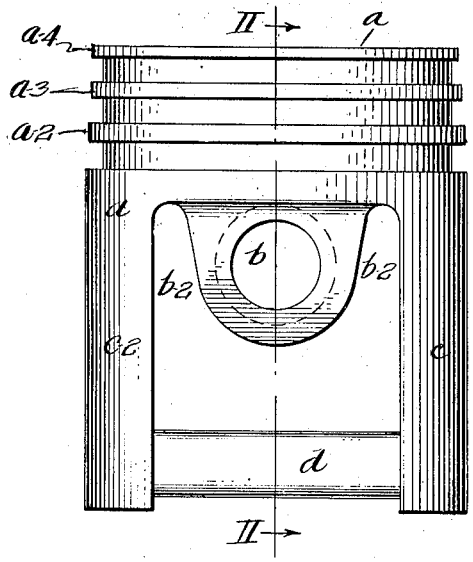
Fig. 1
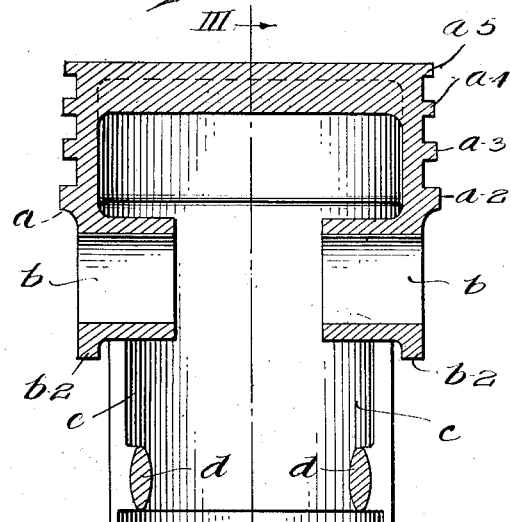
Fig. 2
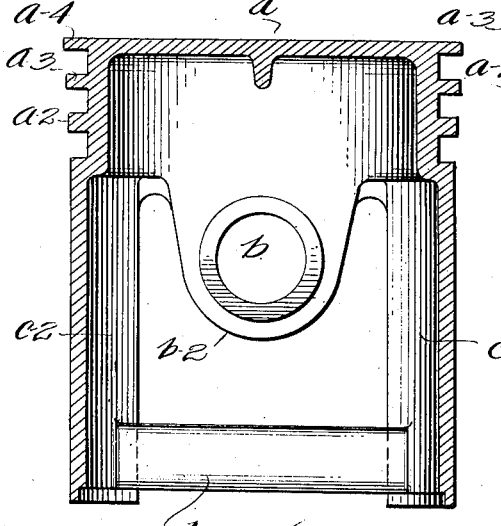
Fig. 3
Fig. 4
Inventor
Edward P. O'Reilly
By Ralzemond A. Parker
Attorney Patented Aug. 3, 1926.

1,594,428

UNITED STATES PATENT OFFICE.

EDWARD P. O'REILLY, OF PONTIAC, MICHIGAN.

PISTON.

Application filed August 18, 1922. Serial No. 582,625.

My invention relates to pistons, and an object of my improvements is to provide an improved aluminum alloy piston for internal combustion engines that shall accommodate itself to the cylinder under the influence of the heat incident to its use and which shall retain its shape, thus obviating binding and the knocking due to lost motion. I secure this object in the device illustrated in the accompanying drawing, in which:

Figure 1 is a side view of the piston involving my invention.

Fig. 2 is a section on the line II—II of Fig. 1.

Fig. 3 is a section on the line III—III of Fig. 2.

Fig. 4 is an inverted plan view.

Fig. 5 is an enlarged detail section.

$a\ a$ is the piston proper or that part carrying the rings and securing a tight joint between the piston and the cylinder walls.

$c\ c^2$ indicates the skirting or guiding portion of the piston. The skirting in this instance consists of two portions $c$ and $c^2$ which are entirely similar and are located opposite each other. These extend down from a portion of the periphery of the part $a$ and are located opposite each other so as to fit against the opposite walls of the cylinder. The portions $c$, $c^2$ of the skirting are arcuate in cross-section, with their center lines in a plane through the axis of the piston and at right angles to the axis of the piston-pin.

$b$, $b$ are the bearings for the piston-pin. These bearings are in lugs $b^2$ which extend downward from the portion $a$ of the piston between the parts $c$, $c^2$ of the skirting, leaving a space between said parts of the skirting and the edges of said lugs. $d$, $d$ are braces extending at right angles to the axis of the piston-pin between points adjacent to the edges of the parts $c$, $c^2$ of the skirting and toward the lower ends of said parts. The braces $d$, $d$ are somewhat narrow transversely and of greater extent vertically and serve not only as braces but as cooling ribs which conduct the heat from the skirting and dissipate it to the mixed oil and gases thrown up by the connecting rod.

$a^2$, $a^3$, $a^4$, $a^5$ indicate successive lands bordering the grooves for the rings. These lands are successively of smaller diameter beginning with the lower $a^2$, which has the greatest diameter, $a^3$ slightly smaller, $a^4$ smaller than $a^3$, and $a^5$ smaller than $a^4$. This is to provide for the expansion by heat during the use of the piston, the upper end of the piston being hottest and the temperature gradually diminishing downward. The differences in diameter is so small that no attempt has been made to show them in Figures 1 and 2, but they are shown in an exaggerated degree in Figure 5.

The braces $d$ prevent the deformation of the piston by the pressure of its lower portion against the cylinder walls and consequently retain the proper guide surface and avoid the binding that comes from forcing the material of the piston inward at points at right angles to the axis of the piston-pin and outward at right angles thereto.

What I claim is:

1. A piston consisting of the part $a$, piston-pin bearings, said bearings being located in lugs extending down from the portion $a$ at points opposite each other, and a skirting consisting of the separate parts $c$, $c^2$ extending downward from the part $a$ at points opposite each other and at right angles to the points at which the lugs $b^2$, $b^2$ are located, adjacent lateral edges of said lugs and said parts of the skirting being separated from each other by a non-conductor of heat.

2. A piston consisting of a part $a$, piston pin bearings, on said part, located opposite each other and a skirting consisting of the separate parts, $c$, $c^2$, extending downward from the part $a$, at points opposite each other and at right angles to the points at which said bearings are located, and a brace $d$ extending between the lower ends of said parts of said skirting below and separate from said bearings.

3. A piston consisting of the part $a$, piston-pin bearings, said bearings being located in lugs extending down from the portion $a$ at points opposite each other, and a skirting consisting of the separate parts $c$, $c^2$ extending downward from the part $a$ at points opposite each other and at right angles to the points at which the lugs $d^2$, $d^2$ are located, adjacent lateral edges of said lugs and said parts of the skirting being separated by a non-conductor of heat, and a brace extending between said parts of said skirting toward their lower ends and adjacent to opposite edges thereof.

4. A piston having piston ring grooves therein, a plurality of lands bordering said grooves forming cylindrical surfaces, said lands diminishing in diameter toward the upper end of said piston.

5. A piston consisting of a part $a$, piston pin bearings, on said part, located opposite each other, and a skirting consisting of the separate parts, $c$, $c^2$, extending downward from the part $a$, at points opposite each other and at right angles to the points at which said bearings are located, and a brace $d$ extending between the lower ends of said parts of said skirting, adjacent to each pair of adjacent lateral edges of said parts below and separate from said bearings.

In testimony whereof, I sign this specification.

EDWARD P. O'REILLY.